(12) United States Patent
Leonard (10) Patent No.: US 6,377,567 B1
(45) Date of Patent: Apr. 23, 2002

(54) SYSTEM AND METHOD FOR DISTRIBUTING DATA COLLECTED FROM CALL CENTER SERVICES (75) Inventor: Timothy M. Leonard, Coralville, IA (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/893,339

(22) Filed: Jul. 16, 1997

(51) Int. Cl.7 ................................................ H04M 3/00
(52) U.S. Cl. .................................. 370/352; 379/265.09
(58) Field of Search ................................ 370/352–356; 379/265–266, 90.1, 90.2, 265.01, 266.1; 705/1, 40, 10; 348/1–5; 455/2.01

(56) References Cited

U.S. PATENT DOCUMENTS

| 4,852,149 A | | 7/1989 | Zwick et al. | |
|---|---|---|---|---|
| 5,001,710 A | | 3/1991 | Gawrys et al. | |
| 5,097,528 A | | 3/1992 | Gurshaney et al. | |
| 5,274,700 A | | 12/1993 | Gechter et al. | |
| 5,323,452 A | | 6/1994 | Dickman et al. | |
| 5,406,557 A | | 4/1995 | Baudoin | |
| 5,455,853 A | | 10/1995 | Cebulka et al. | |
| 5,499,289 A | * | 3/1996 | Bruno et al. ................ | 379/220 |
| 5,517,560 A | * | 5/1996 | Greenspan .................. | 379/114 |
| 5,530,740 A | | 6/1996 | Irribarren et al. | |
| 5,541,986 A | | 7/1996 | Hou | |
| 5,621,789 A | | 4/1997 | McCalmont et al. | |
| 5,642,410 A | | 6/1997 | Walsh et al. | |
| 5,703,943 A | | 12/1997 | Otto | |
| 5,715,307 A | * | 2/1998 | Zazzera ....................... | 379/265 |
| 5,742,675 A | | 4/1998 | Kilander et al. | |
| 5,757,904 A | | 5/1998 | Anderson | |
| 5,790,649 A | | 8/1998 | Hiroshige | |
| 5,793,497 A | * | 8/1998 | Funk .......................... | 358/402 |
| 5,793,861 A | | 8/1998 | Haigh | |
| 5,822,400 A | | 10/1998 | Smith | |
| 5,822,410 A | | 10/1998 | McCausland et al. | |
| 5,839,050 A | * | 11/1998 | Baehr et al. ................ | 455/2.01 |
| 5,867,495 A | * | 2/1999 | Elliott et al. ................ | 370/352 |
| 5,881,131 A | * | 3/1999 | Farris et al. ................. | 379/27 |
| 5,884,032 A | * | 3/1999 | Bateman et al. ........ | 395/200.34 |
| 5,920,847 A | * | 7/1999 | Kolling et al. ............... | 705/40 |
| 5,953,406 A | | 9/1999 | LaRue et al. | |
| 6,073,105 A | * | 6/2000 | Sutcliffe et al. ............... | 705/1 |
| 6,134,318 A | * | 6/2000 | O'Neil ....................... | 379/266 |

FOREIGN PATENT DOCUMENTS

| EP | 0 501 189 | 9/1992 |
|---|---|---|
| EP | 0 545 226 | 9/1993 |
| EP | 0 748 102 | 12/1996 |
| GB | 2 273 853 A | 6/1994 |
| WO | 9209164 | 6/1994 |
| WO | 9605685 | 2/1996 |

OTHER PUBLICATIONS

Harvey et al., "Call Center Solutions", AT & T Technical Journal, vol. 70, No. 5, pp. 36–44, Sep./Oct. 1991.

* cited by examiner

Primary Examiner—Chau Nguyen
Assistant Examiner—Jasper Kwoh (57) ABSTRACT

A distribution system makes reports available to customers of call centers. The report may provide information regarding calls handled by the call center on behalf of the customer. For example, the report provide call statistics, including summary call statistic and individuals call statistic. The report may also include billing detail records. The reports are automatically generated and distributed for access by the customers via computing resources. The distribution may be accomplished in near real time. The reports may consolidate data gathered from multiple agent consoles and from multiple call centers, including geographically call centers. Separate reports may be provided for each of the customers served by the call centers.

29 Claims, 8 Drawing Sheets

```
------------------------------------------------------------
800 Number          : (800) 555-1212
Date:               : 11/31/95

Total Calls         : 6
Average Handle Time : 02:30

Time                 Orig Num          Duration    Status
-----------------    --------------    --------    ------
11/31/95 00:23:14    (515) 454-5555    00:00:13    101
11/31/95 00:56:24    (515) 454-5555    00:04:01    101
11/31/95 08:11:10    (515) 454-5555    00:02:15    101
11/31/95 00:23:14    (515) 454-5555    00:02:55    15000
11/31/95 00:23:14    (515) 454-5555    00:03:21    101
11/31/95 00:23:14    (515) 454-5555    00:02:35    15001

-------------------------- page 1 --------------------------
```

FIG. 8A

```
------------------------------------------------------------
AnswerNet Traffic Summary Report
Date:                    : 11/31/95

Total Calls              : 6,562
Average Handle Time      : 03:43

800 Number       # of Calls    Dur
-----------      ----------    ------
800 444 1212       4,235       3:13
800 555 1212       1,245       5:15
800 666 1212           4       4:30
800 777 1212         202       1:55

-------------------------- page 1 --------------------------
```

FIG. 8B

SYSTEM AND METHOD FOR DISTRIBUTING DATA COLLECTED FROM CALL CENTER SERVICES

TECHNICAL FIELD

The present invention relates generally to telecommunications systems and, more particularly, to a system for delivering data collected from call center services.

BACKGROUND OF THE INVENTION

A typical call center includes a number of agents who handle inbound telephone calls and place outbound telephone calls on behalf of business clients, known as "customers". Each agent within a call center may receive or place calls on behalf of multiple customers at an agent station, which typically includes a computer system, a phone pad, and a telephone headset. The services that are provided to the customers may include conducting caller surveys, performing telemarketing, providing technical assistance, obtaining orders, or other activities. The call center includes a system for receiving and distributing telephone calls to the agents at their respective stations. The call center may also include other intelligent peripheral devices, such as audio response units.

Application programs are typically run on the computer systems at agent stations to assist agents in handling calls. These application programs may provide scripts to the agent that present textual questions for the agent to ask the caller. The application programs may also include functions for entering the caller's responses to the questions, taking orders from the caller, and providing the agent with a series of options under predefined decision trees. The application programs may also include automated functions for processing incoming calls, such as the creation of billing records and the interaction with an automated call distributor (ACD).

The customers that are serviced by a call center may be in different types of businesses. For example, a first customer may run a mail order catalog, whereas the second customer may seek survey information based upon a current advertising campaign. As a result, the information gathered from callers may vary dramatically from customer to customer. Another complication is that the customers may require data derived from the calls by callers to be delivered to the customers. The data may need to be collected for a customer from calls that are handled by geographically distributed call centers. Hence, it is difficult to provide such data to the customers.

SUMMARY OF THE INVENTION

The present invention provides a mechanism for gathering and consolidating information from callers on behalf of customers into reports that are sent to the customers. The reports may include call statistics regarding calls handled on behalf of customers and may also include billing details. The reports may be generated in near real time such that the information about calls contained in the reports is posted for customers shortly after calls complete. The reports may be posted for access via an intranet, and extranet or the Internet.

In accordance with a first aspect of the present invention, a computer-implemented method is practiced in a telecommunications system that has a computer system and call centers. The call centers include agents stationed at agent consoles for handling calls with callers on behalf of customers. Data is gathered from calls that are handled on behalf of a selected customer at multiple ones of the agent consoles at multiple call centers. The gathered data is then consolidated into a report that is made available to the selected customer.

In accordance with another aspect of the present invention, a computer-implemented method is practiced in a system that has a computer system and geographically distributed call centers. Each call center has agents stationed at agent consoles for handling calls on behalf of customers. Data is collected from the calls at agent consoles in the call centers. For each of the customers, a report is generated that holds at least some of the data that was collected from calls that were handled on behalf of the client. These reports are then posted for the customers.

In accordance with an additional aspect of the present invention, a customer report server is provided for generating reports regarding call activity by agents in call centers on behalf of customers. The server includes a database that holds data gathered by agents in the call center regarding calling activity by the agents on behalf of the customers. The server also includes a report generator for generating reports for the customers regarding call activity by the agents on behalf of the customers. An access subsystem is provided in the server for making the reports that are generated by the report generator accessible to the customers.

BRIEF DESCRIPTION OF THE DRAWINGS

An illustrated embodiment to the present invention will be described below relative to the following figures.

DETAILED DESCRIPTION OF THE INVENTION

The present invention provides a system for distributing data collected from call center services. In the illustrative embodiment of the present invention described below, data is distributed to customers in near real time. In other words, there is only a minimal delay between when data is gathered, consolidated into reports, and available to a customer. The system may gather data for multiple customers from geographically distributed call centers and distribute the data in report form for the respective customers. The reports may hold information regarding data that is collected from callers and may hold statistical data. In the illustrative embodiment, the statistical data that is provided in two types of reports: a summary report and an individual call detail report. The summary report holds summary data regarding calling activity of half the customer. The individual call detail report holds detailed information regarding individual calls that were handled by an agent on behalf of the customer.

The reports may be distributed over a network, such an intranet and extranet or the Internet using the file transfer protocol (FTP). The reports may be posted on a bulletin board that may be accessed via a network. The reports may be posted frequently (such as multiple times per day) according to customer needs.

Before discussing the system in more detail, it is helpful to define a few terms. As used generally herein, a "service provider" is a company that performs call center services for other companies or customers. A "customer" typically refers to a company for whom services are being performed by the service provider. A customer typically owns one or more telephone numbers such as toll free numbers (1-800 or 1-888 numbers), and contracts a service provider to handle calls for at least one of the numbers. A "caller" typically refers to a person calling the number, and who is routed to the service provider's call center. A caller is typically, but not necessarily, a customer/client/prospect of the above-defined "customer."

Figure 1:
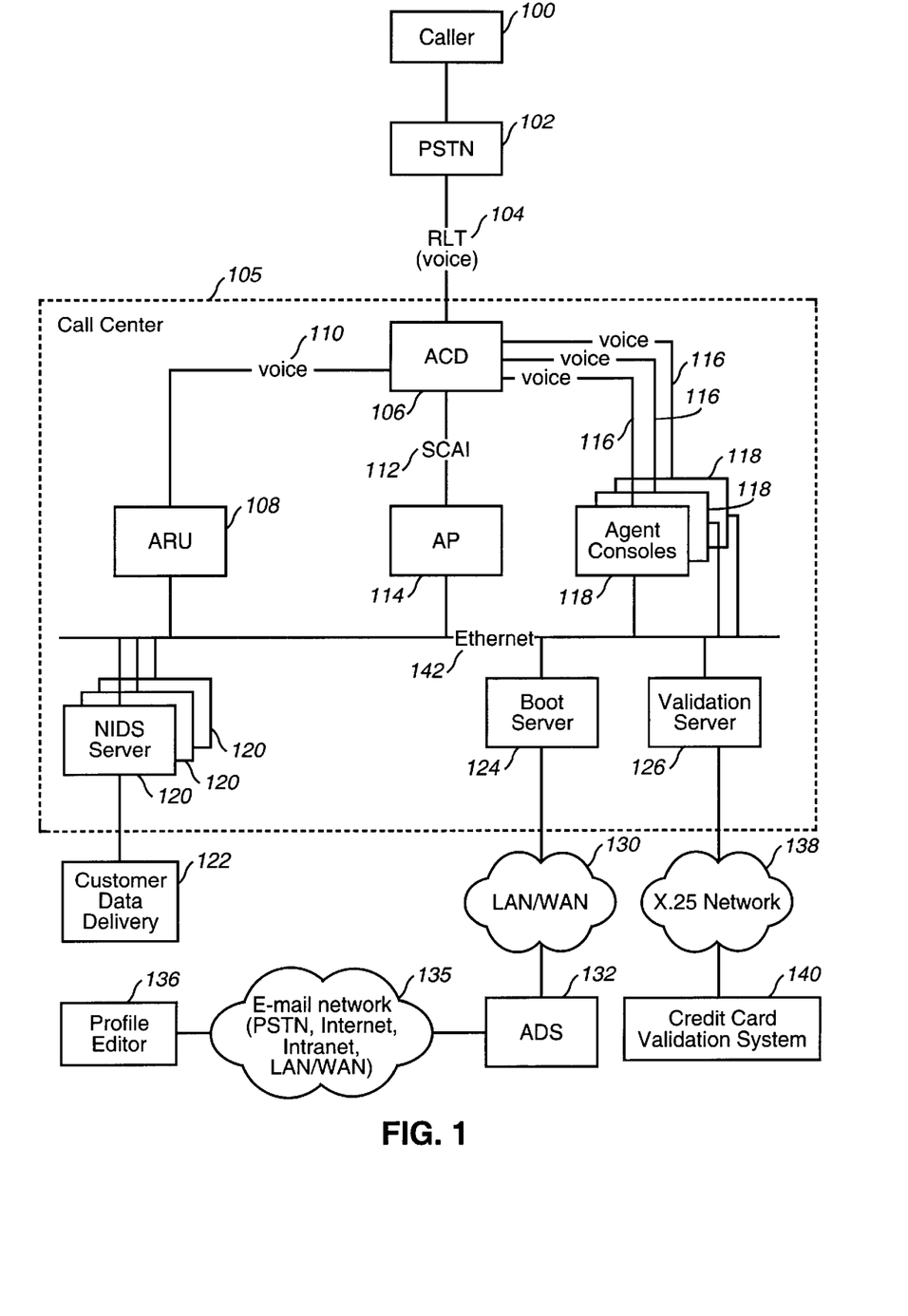
FIG. 1 is a block diagram of a telecommunications system that is suitable for practicing the illustrative embodiment of the present invention.

FIG. 1 depicts a telecommunications system that is suitable for practicing the preferred embodiment of the present invention. This telecommunications system includes a call center 105 that may be accessed by caller 100 via a public switched telephone network (PSTN) 102. The PSTN 102 may be connected to the call center 105 via a voice release trunk (RLT) 104. The call center 105 includes an automatic call distributor (ACD) 106 for distributing calls within the call center. The ACD is connected via a voice trunk 110 to an automated response unit (ARU) 108. The ARU 108 provides voice response and menu routing functions to a caller.

The call center 105 may also include an application processor (AP) 114 that is associated with the ACD 106. The AP 114 may be a dedicated computer system that provides intelligent application processing for assisting the ACD 106. In particular, certain functionality that may be performed by the ACD 106 is off loaded to the AP 114 to enable the ACD to focus on performing switching and queuing functions. The AP 114 is linked to the ACD 106 via an ISDN implementation of a switch/computer application interface (SCAI) link 112.

The call center 105 may include multiple agent consoles 118. These consoles 118 are connected to the ACD 106 via voice trunks 116. Each agent console may include a workstation, a telephone pad, and a headset. Human operators at the agent consoles perform scripts, prompting, and transferring of calls that are needed for call processing on behalf of customers.

The call center 105 may also include multiple network information distributed servers (NIDS) 120. Each of the NIDS 120 may be implemented as a separate computer system. The NIDS 120 may be redundant, and generally serve the role of storing database information, including data and billing records. The NIDS servers 120 are interfaced with the Customer Data Delivery System 122, which is responsible for delivering the data reports to customers, as will be described in more detail below. The NIDS 120 may all be connected to an Ethernet local area network (LAN) 42 that also interconnects the ARU 108, the AP 114, the agent consoles 118, a boot server 124, and a validation server 126.

The boot server 124 stores the customer profiles in the call center 105 and is responsible for distributing the customer profiles to other entities within the call center 105. Each customer profile contains information regarding a customer, including name, address, products, data record format, etc. Customer profiles are described in more detail in copending U.S. patent application Ser. No. 5,953,406, entitled "Generalized Customer Profile Editor For Call Center Services," which was filed on May 20, 1997, and which is explicitly incorporated by reference herein. The validation server 126 is responsible for performing credit card validations for caller orders. The validation server 126 may be connected via a network, such as an X.25 network 138 to a credit card validation system 140.

The boot server 124 is connected via a LAN or wide area network (WAN) 130 to an answernet delivery service (ADS) 132. The ADS 132 may be implemented by a midrange computer system that is responsible for delivering customer profiles to the appropriate boot servers via the LAN/WAN 130. The ADS 132 may be connected to multiple call centers and may distribute the customer profiles to the appropriate call centers. Customer profiles are received from the profile editor 136. The customer profiles may be emailed over an email network 135 (such as a PSTN, the Internet, an intranet, or a LAN/WAN) 134 to the ADS 132. The profile editor 136 may be run on a personal computer, such as a portable computer that may be carried by a marketing representative.

Those skilled in the art will appreciate that the configuration shown in FIG. 1 is intended to be merely illustrative and not limiting of the present invention.

Figure 2:
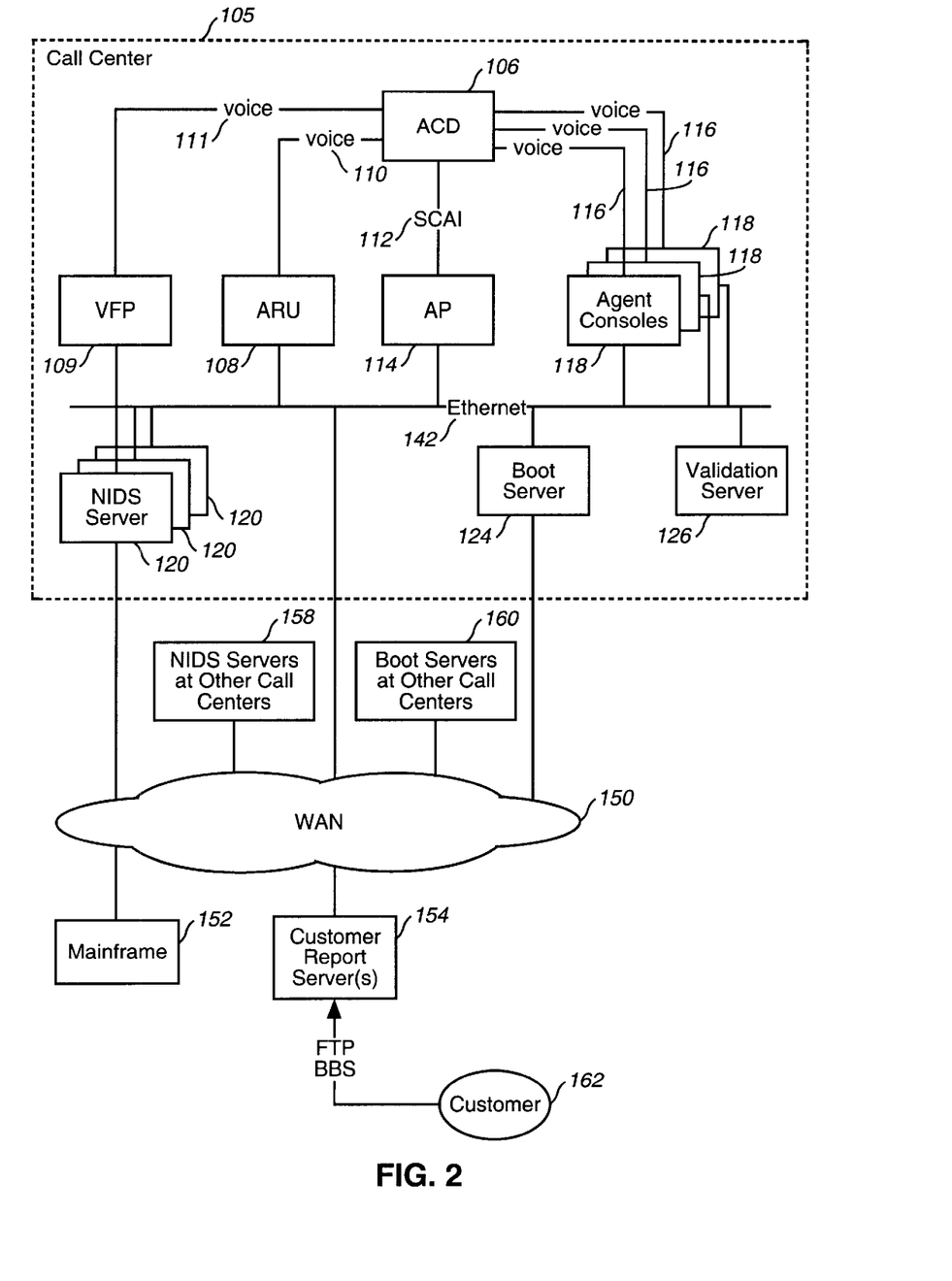
FIG. 2 is a block diagram illustrating the call center and customer data delivery system of FIG. 1 in more detail.

FIG. 2 depicts the physical architecture of the customer delivery system 122 in more detail. A wide area network (WAN) 150, such as a token ring network, is used to connect the NIDS servers 120 and the boot servers 124 and 160 of each call center to a mainframe computer 152. The mainframe computer includes a data distribution system (DDS) that is responsible for collecting the billing and call data from the NIDS servers 120 at the call center and from NIDS servers at other call centers 158 and delivering the collected data to the customer report servers(s). The DDS is described more extensively in copending U.S. patent application Ser. No. 08/527,901, entitled "System and Method for Hierarchical Data Distribution," which was filed on Sep. 14, 1995, which is assigned to a common assignee with the present application and which is explicitly incorporated by reference herein.

Customer report server(s) 154 may be connected to the WAN 150. Each customer report server is a server process running on the computer system that is used to collect and store the data that is collected from callers and the call statistics data that is derived from billing detail records (BDRs), which will be described in more detail below. The customer report server(s) 154 compile textual reports from the data for customers 162. As was discussed above, the reports may be accessed by the customers 162 over an intranet and extranet or the Internet by posting the reports on bulletin board services (BBS), or by labeling the customer to receive copies of the files that hold the reports using the file transfer protocol (FTP).

NIDS servers at other call centers 158 are interconnected via the WAN 150. Similarly, boot servers 160 and other call centers may be interconnected via the WAN 150 to the other components shown in FIG. 2. These call centers may be geographically dispersed.

Figure 3:
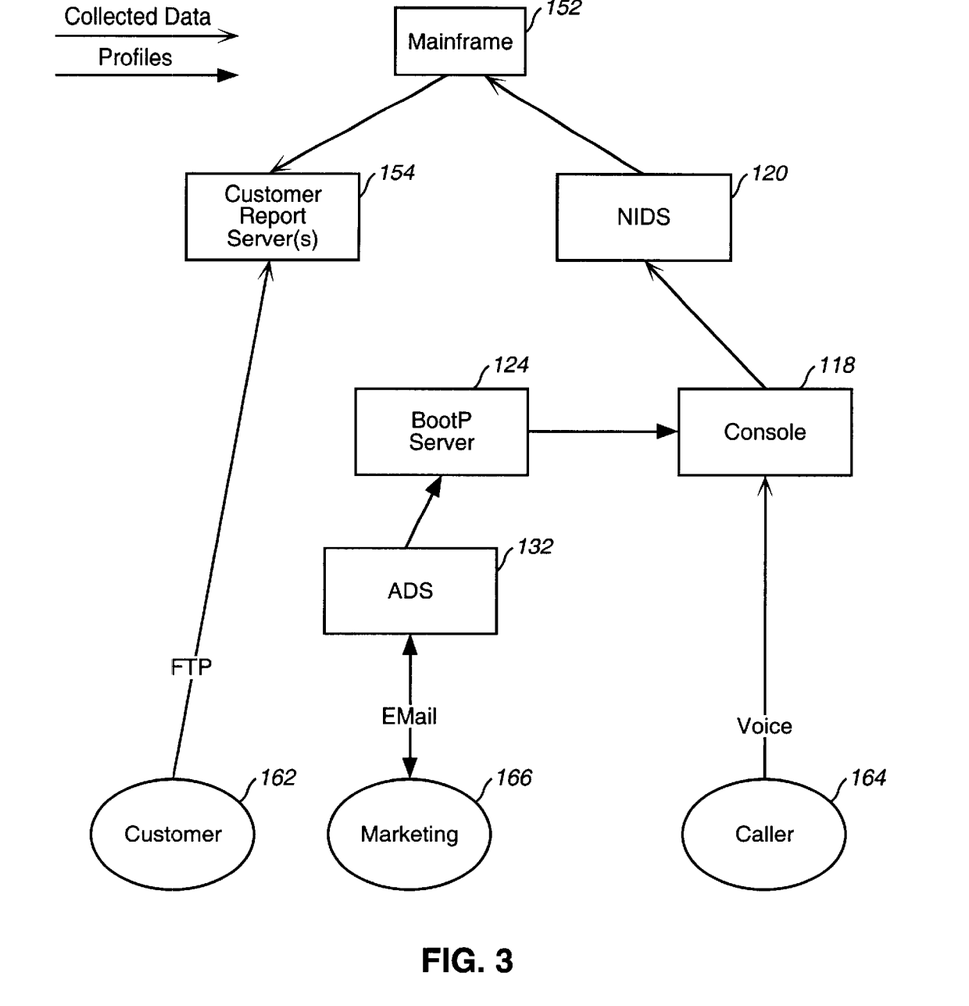
FIG. 3 illustrates data flow within components of the telecommunications system of FIG. 2.

FIG. 3 illustrates the data flow within the system of FIGS. 1 and 2. A caller 164 provides voice data that is received by an agent at an agent console 118. The agent collects data from the caller 164 and forwards the collected data to the NIDS server 120. The NIDS server 120 forwards the collected data to the mainframe computer 152. Data stored in the mainframe 152 is used by the customer report server(s) 154 to generate customer reports. The customers 162 may obtain the data over a network using the FTP protocol.

Customer profiles are also passed among the components depicted in FIG. 3. In particular, the boot server 124 passes customer profiles to an agent console 118. The profile is used to obtain scripts for gathering the requisite information from the caller 164 and to provide information regarding the customer. The ADS 132 may also send and receive customer profiles from a marketing department 166 that is responsible for marketing campaigns and other services that are provided by the call center.

Figure 4:
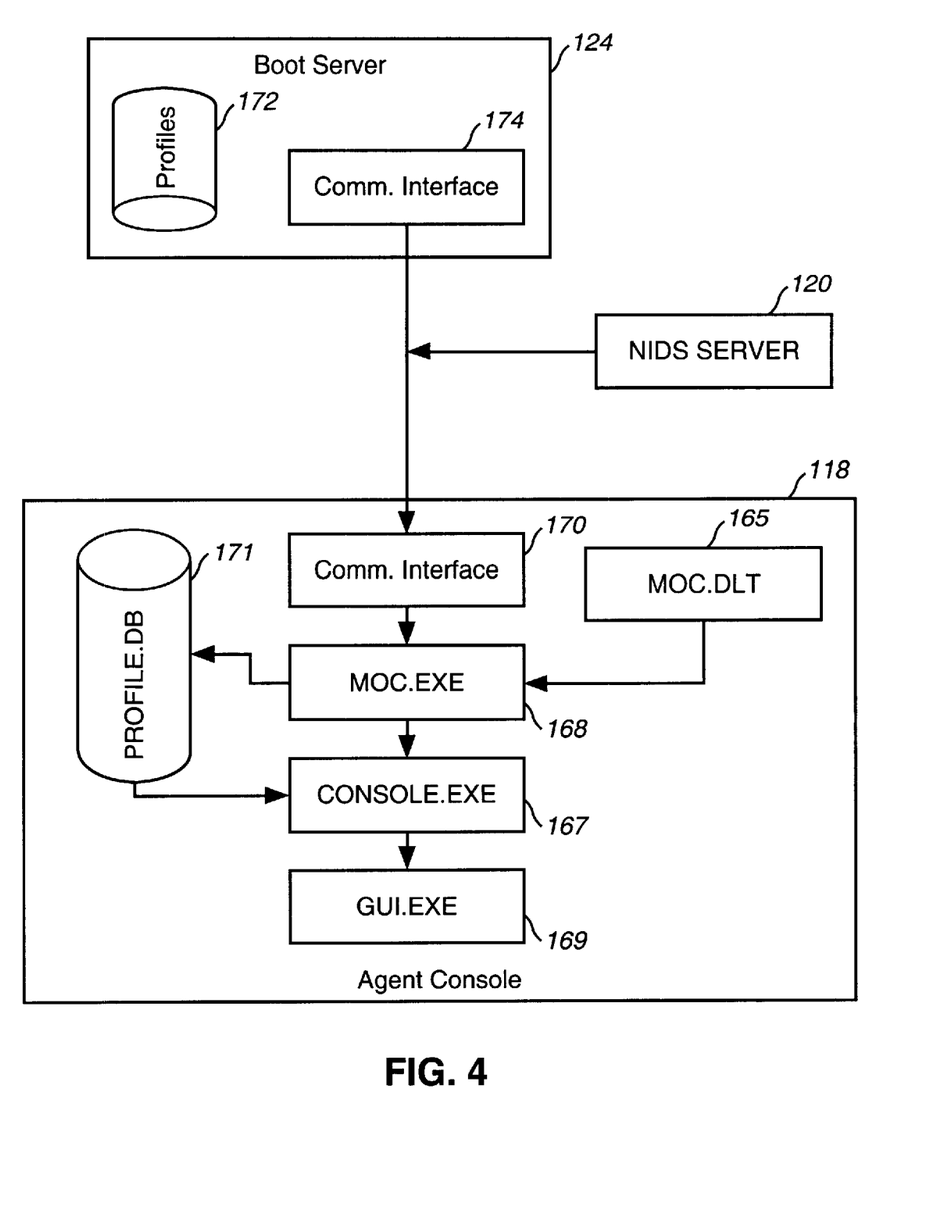
FIG. 4 illustrates components of the boot server in the agent console in more detail.

In order to gain an appreciation for what kind of data is gathered by an agent during a call, it is helpful to review operation of a console. FIG. 4 depicts a logical architecture of the agent console 118, which includes three executable files CONSOLE.EXE 167, MOC.EXE 168, and GUI.EXE 169. CONSOLE.EXE 167 performs core processing of call flows in the agent console 118, while GUI.EXE 162 provides a graphical user interface (GUI) for the agent for display on a display device. MOC.EXE 168 transfers and receives data to and from the agent console 118, as described below.

A communication interface process 170 communicates with a similar communication interface process 174 in the boot server 124. The communication interface process 170 also communicates with the NIDS server 120, as well as other components connected to the Ethernet LAN 142. A configuration file, MOC.DLT 165, contains information such as which profiles the agent console 118 should retrieve from the boot server 124. In the exemplary embodiment, MOC.DLT 165 identifies directories or locations of profiles on one or more of the boot servers 124 of profiles to be downloaded to the agent console 118 (e.g., multiple profiles may reside in a given directory). In the exemplary embodiments, MOC.DLT 165 and MOC.EXE 168 may employ wildcard characters to represent more than one character and thereby retrieve multiple profiles. Based on the configuration file MOC.DLT 165, MOC.EXE 168, via the communication interfaces 170 and 174, retrieves an appropriate profile from a profile database 172 in the boot server 124, and stores it in local storage, such as a local database PROFILE.DB 171 in the agent console 118.

Figure 5:
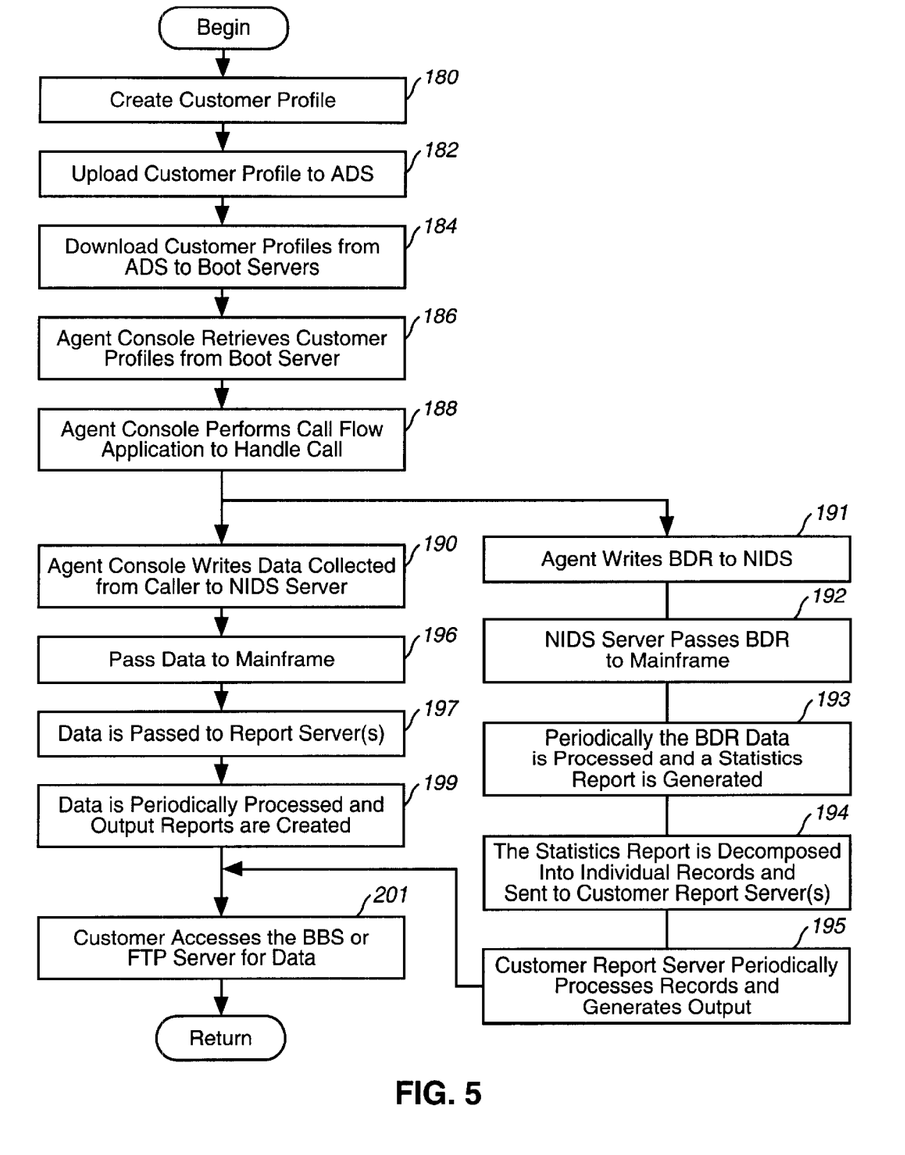
FIG. 5 is a flowchart illustrating the steps that are performed in generating a report in the illustrative embodiment of the present invention.

In order to gain a complete understanding of the customer delivery system, it is useful to review the process of creating a customer profile and processing calls using the profiles. FIG. 5 depicts the steps performed in this process. In step 180, a sales or marketing representative creates a customer profile. In the exemplary embodiment, the representative creates the customer profile using a profile editor.

In step 182, the representative uploads the customer profile to the ADS 132 via an e-mail network, such as a PSTN, Internet, Intranet, LAN/WAN, etc. In the exemplary embodiment, the representative attaches the profile to an e-mail sent to the ADS 132. The ADS 132 receives the e-mail, extracts the customer profile, and validates the profile, as discussed above. If the profile meets the validation requirements, then in step 184, the ADS 132 distributes the profile to one or more of the boot servers 124. The ADS 132 uses an internal configuration file to determine which profiles to send to which of the boot servers 124. If the profile is not validated, then the ADS 132 returns the message to the representative indicating that the profile was not validated, preferably with a reason code to help instruct the representative as to how to correct the error.

In step 186, the agent console 118 retrieves one or more customer profiles from one or more of the boot servers 124. When the agent console 118 is initialized, or powered up, MOC.EXE 168 queries MOC.DLT 165 to determine which customers will be handled by the agent console 118. Customers are typically identified by their 800/888 toll-free number ("800 number") that callers may dial.

Each customer profile stored on the boot servers is stored as a file named for or with the customer's 800 number. Each profile also includes an activation date and time. The activation date/time represents the date and time that the profile will become activated. As a result, representatives can create the profile for future use, and upload and store it in one of the boot servers, without the profile being used and prior to its activation date/time.

At start up, MOC.EXE 168 determines from MOC.DLT 165 which profiles to retrieve from the boot server 124. MOC.EXE 168 then places these retrieved profiles in the profile database PROFILE.DB 171. When the ACD 106 receives a call, the ACD sends a call offer message containing the dialed number to the AP 114. The AP 114 then forwards the call to an appropriate agent console 118 previously specified as handling calls for the dialed number. Thereafter, CONSOLE.EXE 167 uses the dialed number as a key to retrieve the appropriate customer's profile from PROFILE.DB 171. Alternatively, multiple numbers can be associated with the same customer profile. Therefore, CONSOLE.EXE 167 retrieves a property record based on the dialed number, where the property record identifies the appropriate customer profile, and then retrieves the appropriate customer profile.

In an alternative implementation, at start up and after determining from MOC.DLT which profiles to retrieve, MOC.EXE 168 queries the profile database 172 on the boot server 124 and retrieves the profiles specified in MOC.DLT. MOC.EXE 168 then places the retrieved profiles in the local database PROFILE.DB 171. When the agent console 118 receives a call, CONSOLE.EXE 167 retrieves from the database PROFILE.DB 162 only the profile named or corresponding to the dialed number that has the most recent activation date/time, and which is not in the future. In yet another alternative implementation, certain agent consoles 118 provide call center services for particular customers. Therefore, PROFILE.DB 171 locally stores certain customer profiles therein. MOC.EXE 168 first determines whether the appropriate customer profiles are stored in the local profile database PROFILE.DB 171. MOC.EXE 168 then queries the profile database 172 on the boot server 124 via LAN messaging and the communication interfaces 170 and 174 to determine if any new profiles exist for the given 800 number.

In step 188, the agent console 118 receives a call and performs a call flow process to handle the call. CONSOLE.EXE 167 loads from PROFILE.DB 171 the customer profile associated with the received call and performs a call flow defined generically by compiled source code customized by the customer profile. Rather than a compilation of source code, the call flow process or application is an interpretation by executable code. CONSOLE.EXE 167 reads data in from the customer profile stored in the profile database PROFILE.DB 171, and interprets that data to perform the call flow process. This process is much quicker in execution than compiling customer flow data with source code at one time during a call. Additionally, this process is much quicker to develop than developing individual applications, customized for each customer.

In step 190, the agent console 118 writes data collected from the caller to a database on the MDS server 120. More specifically, when the call is completed, CONSOLE.EXE 167 formats the collected data to customer specifications identified in the customer profile, and then writes the data to a results file in the NIDS 120. Alternatively, the agent console 118 may locally store the collected data if the agent console determines that it cannot communicate with the NIDS 120. The customer specifications identified in the profile can include how many columns are defined, if delimiters are to be used (e.g., commas), what type of delimiters are to be used, etc. CONSOLE.EXE 167 sends the collected and formatted data to the NIDS server 120 as individual data records. Each record identifies the customer, typically by 800 number and date/time. Thus, the collected data can be available to the customer within minutes of being collected.

In step 191, CONSOLE.EXE 167 creates a billing data record ("BDR") with call statistics, such as the caller's ANI, dialed number, customer identifier, call duration, call date/time, agent that handled the call, services provided to the caller, etc. CONSOLE.EXE 167 sends the BDR to the NIDS server 120. The BDR will be forwarded by the NIDS to downstream call processing billing systems, for billing purposes. The NIDS server 120 also sends the BDR to the mainframe 152 which processes the BDR into reports that may be downloaded (step 192 in FIG. 5). The BDR data is periodically processed and a statistics report is generated (step 193 in FIG. 5). The statistics report is decomposed into individual records and sent to the customer report server(s) 154 (step 194). The customer report server(s) 154 then periodically process the records to generate output (step 195 in FIG. 5). The customers may access the reports on the server (step 201 in FIG. 5).

The data collected from the caller is passed from the NIDS server 120 to the mainframe 152 (step 196 in FIG. 5). The data is passed to the customer report server 154 (step 197 in FIG. 5). The data is periodically processed and output reports are created (step 199 in FIG. 5). The customers may then access the BBS or use FTP to gain access to the reports (step 201 in FIG. 5).

The agent console 118, when creating a BDR record, uses data generated by the agent console, as well as data received from the ACD 106. CONSOLE.EXE 167 of the agent console 118 performs the BDR creation function, which has many common elements or fields, regardless of the individual customer application. Therefore, a separate application need not be developed for the agent console 118 for each customer profile to create billing records. Instead, the representative may create any customized BDR when creating the customer profile.

In general, data processed in the platform 105 is modeled in a tag-length-data format, in that each data record or field has three parts. First, a "tag" identifies the type of data, including a version of the type. Second, a "length" specifies the length of the entire record. Third, the actual data follows. Each aspect of a call flow process is specified in this format (i.e., what a question looks like to an agent, what is written to a BDR, product orders, etc.). Data records pulled from a customer profile are similarly in this format, as well as data collected from the agent at the agent console 118, and which is written to the NIDS server 120.

By specifying a generically-defined tag in each record, rather than defining an actual data type, the platform 105 is independent of operating systems and data type versions. If a certain component (e.g., PC containing the profile editor, agent console, ADS, boot server, etc.) changes, perhaps due to a change in the operating system, the data record still conforms to the interface specification. Each component maps a generically-defined tag to its own data type. Also, if a version of a data type in a certain component changes, it does not affect other components. In this manner, one can replace an OS/2 agent console 118 with a Windows agent console, or other operating system, since communication of data records in the exemplary embodiment is independent of the operating system or the computer that generated the data.

The agent console 118 preferably formats collected data in two general formats: data only and labeled data. Typically, an order entry call flow process provides only data in labeled data format, while survey and direct response can provide data in either format.

Under the data only format, data collected from callers is provided in predetermined positions, where such positions determine the field to which the data pertains. Customers preferably have the ability to define the field delimiters as well as record delimiters under the profile editor. In the exemplary embodiment, the first six fields of each record generated by the agent console 118 based on a call are automatically generated by CONSOLE.EXE 167, as shown below in Table 1. Subsequent fields are recorded by the agent in the order that they are stored in the customer profile, and thus in the order displayed to the agent on the screen. Consequently, each record includes the six initial fields plus the number of questions provided under the customer profile.

In the exemplary embodiment, all fields are stored in quotation marks, except for a status code and operator duration. Fields not collected by an operator are simply stored a set of quotations without any intervening space or character indicating that no data was collected for that field. In the exemplary embodiment, a records delimiter is CR-LF. Table 1 below shows an exemplary data structure for data collected under survey or direct response call flow process and exemplary data collected.

TABLE 1

| Field Number | Contents |
| --- | --- |
| 1 | BDR Sequence Number |
| 2 | Timestamp |
| 3 | Status |
| 4 | Duration |
| 5 | 800 Number |
| 6 | Profile Start Date |
| 7 | $1^{st}$ Field |
| 8 | $2^{nd}$ Field |
| 9 | $3^{rd}$ Field |
| n | $4^{th}$ Field |

Exemplary Data:

| Field Number | Field Name | Field Example | |
| --- | --- | --- | --- |
| 1 | BDR Seq# | "038012345678" | |
| 2 | Time/Date | "Dec 17 1995 13:58" | |
| 3 | Status | 101 | |
| 4 | Duration, Sec | 231 | |
| 5 | 800 Numer | "8005551212" | |
| 6 | Start Date | "1201950000" | (start date of the profile) |
| 7 | Prior Order? | "No" | (first survey question) |
| 8 | Contact | "Via Friend" | (2nd survey question) |

-continued

| Field Number | Field Name | Field Example |
|---|---|---|
| 9 | Day Phone | "5552221111" |
| 10 | Phone Extension | "x2256" |
| 11 | First Name | "Jon" |
| 12 | Last Name | "Doe" |
| 13 | Addr1 | "1260 3rd Street" |
| 14 | Addr2 | "Suite 120" |
| 15 | City | "Iowa City" |
| 16 | State | "IA" |
| 17 | Zip | "52246" |
| 18 | Mailing | "Yes" |

Exemplary data output under the data only format for two consecutive records is presented below. The exemplary data presented below is listed as if the DOS command TYPE<filename>was executed on the data, so that the data would word wrap and the entire contents displayed on a computer screen.

"0380123412345678", "Dec 17 1995 13:58", 101, 231, "8005551212", "1201950000", "No", "Via Friend", "5552221111", "x2556", "Jon", "Doe", "1260 3rd Street", "Suite 120", "Iowa City", "IA", "52246", "Yes" "0380123412345689", "Dec 17 1995 14:58", 101, 131, "8005551212", "1201950000", "No", "Company", "6662221234", " ", "Sam", "Davis", "220 Walnut Drive", " ", "Coralville", "IA", "52245", "NO"

Under the labeled data format, a label identifies every field collected by an agent in the corresponding collected data record. Thus, the agent console 118 can handle variable amounts of fields and collected data for each received call, such as with an order entry call flow process. Additionally, the labeled data format provides a very generic version of "ASCII free form text." Under the exemplary embodiment, the customer can define values for three items in the resulting records: column separator, field separator and record delimiter.

Field labels define the first six fields automatically collected under CONSOLE.EXE 167, which each begin with a "@" symbol. Field labels for data collected by an agent are defined in each customer profile and must have a unique value. All collected data can be written in quotes except status code, operator duration, order entry, quantity and order entry price.

Two options for data population of fields under order entry call flow processes are preferably provided: survey data repeated and single survey data. Such options are defined in the customer profile. Under the survey data repeated option, CONSOLE.EXE 167 repeats all survey questions collected by the agent and credit card data for every item purchased. Thus, a data record for every item purchased will include all data that was collected under the survey portion of the call along with the credit card data. For example, if three items are purchased during a single order entry call, then CONSOLE.EXE 167 produces three collected data records, each with the same six reserved system fields (the first six fields), survey information (e.g., customer name and address) and credit card data.

Under the single survey data format, CONSOLE.EXE 167 writes a single collected data record, even if multiple items are purchased. CONSOLE.EXE 167 can collect only fields associated with the product being sold. Only those fields associated with a given product are collected and written to output records. For example, if a product A requires two additional fields to be collected such as cookie flavor and greeting card, while product B requires three items such as cookie flavor, greeting card and personalization data, CONSOLE.EXE 167 only records two or three additional fields for products A and B, respectively.

Table 2 below shows the customer definable options under the labeled data format. Such options are defined in the customer's profile.

TABLE 2

| Delimiter Type | Function | Typical Values |
|---|---|---|
| Field | Separates fields inside of a collected data record | <CR><LF> |
| Record | Separates individual records | @newrec or <CR><LF> |
| Column | Separates the field label from the field data | Comma and a tab |

Table 3 below shows an exemplary data structure for a record under the labeled data format having both the initial six system defined labels, and subsequent customer defined labels (as defined in the customer profile).

TABLE 3

| Field Number | Contents | Field Label Definition |
|---|---|---|
| 1 | BDR Sequence Number | @BDRSeqNum |
| 2 | Timestamp | @TimeDate |
| 3 | Status | @Status |
| 4 | Duration | @Duration |
| 5 | 800 Number | @800Num |
| 6 | Profile Start Date | @StartDate |
| 7 | 1$^{st}$ Field | <from profile> |
| 8 | 2$^{nd}$ Field | <from profile> |
| 9 | 3$^{rd}$ Field | <from profile> |
| n | n$^{th}$ | <from profile> |

Presented below is an exemplary record under the labeled data format, employing the following three customer defined options: column delimiter of "comma plus tab," field delimiter of "CR-FL" and record delimiter of "<pagebreak>".

123456789012345678901234567890123456789012345678 90

| | |
|---|---|
| "@BDRSeqNum", | "1234567890123456" |
| "@TimeDate", | "14:28:35 DEC 05, 1995" |
| "@Status", | "101" |
| "@Duration", | "231" |
| "@800Num", | "8005551212" |
| "@StartDate", | "199603010000" |
| "Name_First", | "Timothy" |
| "Name_Middle", | "M" |
| "Name_Last", | "Leonard" |
| "St_Addr", | "421 SE 3rd" |
| "City", | "Ankeny" |
| "State", | "IA" |
| "Phone", | "5159653749" |
| "Cred_Card", | "1234567890123" |
| "Exp_Date", | "0197" |
| "Zip", | "50021" |
| "Conf_num", | "1A2E4" |
| "Prod_SKU", | "CHRS_BOX_DZN" |
| "Prod_Name", | "Dozen Christmas Cookies" |
| "Cookie Flavor", | "Mixed Flavor" |
| "@Quantity", | "1" |
| "Greet_Card", | "Thanks for a good year" |
| "Greet_Card", | "and best wishes for a" |
| "Greet_Card", | "successful 1996 - MCI" |
| "Customization" | |
| "Prod_SKU", | "SANTA_DZN" |

-continued

| 1234567890123456789012345678901234567890 | |
|---|---|
| "Prod_Name", | "Dozen Santa Cookies" |
| "Cookie Flavor", | "Mixed Flavor" |
| "@Quantity", | "1" |
| "Greet_Card", | "Thanks for a good year" |
| "Customization", | "" |
| "Prod_SKU", | "PEG_ROCK_HORSE" |
| "Prod_name", | "@CUSTOM - Pegasus Rocking Horse" |
| "Cookie Flavor", | "Mixed Flavor" |
| "@Quantity", | "1" |
| "Greet_Card", | "" |
| "Customization", | "John Smith" |
| "Customization", | "Nov. 28, 1995" |
| "Customization", | "7 lb 2 oz" |
| "Ship_name_First", | "Timothy" |
| "Ship_Name_Middle", | "M" |
| "Ship_Name_Last", | "Leonard" |
| "Ship_St_Addr", | "421 SE 3rd" |
| "Ship_City", | "Ankeny" |
| "Ship_State", | "IA" |
| "Ship_Phone", | "5159653749" |
| "Ship_Method", | "UPS Standard" |
| "@Order_tot_Products", | "$123.02" |
| "@Order Tax", | "$0.00" |
| "@Order Ship & Handle", | "$39.00" |
| "@Order Total", | "162.02" |
| <page break> | |

In the illustrative embodiment, status codes are also written to collected data records to document the manner in which calls are terminated. Such status codes can be employed by the customers to filter data collected by the agents. Many calls may be terminated and recorded as "successful," while various other calls may be unsuccessful for a variety of reasons. Table 4 below shows exemplary decimal and hexadecimal values for status codes, and corresponding descriptions for each code.

TABLE 4

| Decimal Value | Hex Value | Description |
|---|---|---|
| 257 | 101 | Success, valid call or order, all required fields collected and the operator has pressed the "DONE" soft key. |
| 5376 | 1500 | Caller disconnects prior to the "DONE" key being displayed. The done key is presented to the operator only after all required fields have been collected. |
| 5377 | 1591 | Caller disconnects after the done key is displayed and the operator selected the 'exit' or 'cancel' key (Operator discretion that the call was not complete) |
| 5378 | 1502 | The caller disconnects on an order prior to the credit card number be launched for validation (prior to the complete order key being selected) |
| 5379 | 1503 | The operator disconnects (flushes) the call. |
| 5380 | 1504 | The 'Cancel Order' key was pressed by the operator |
| 5381 | 1505 | The call was transferred to customer service. |

Figure 6:
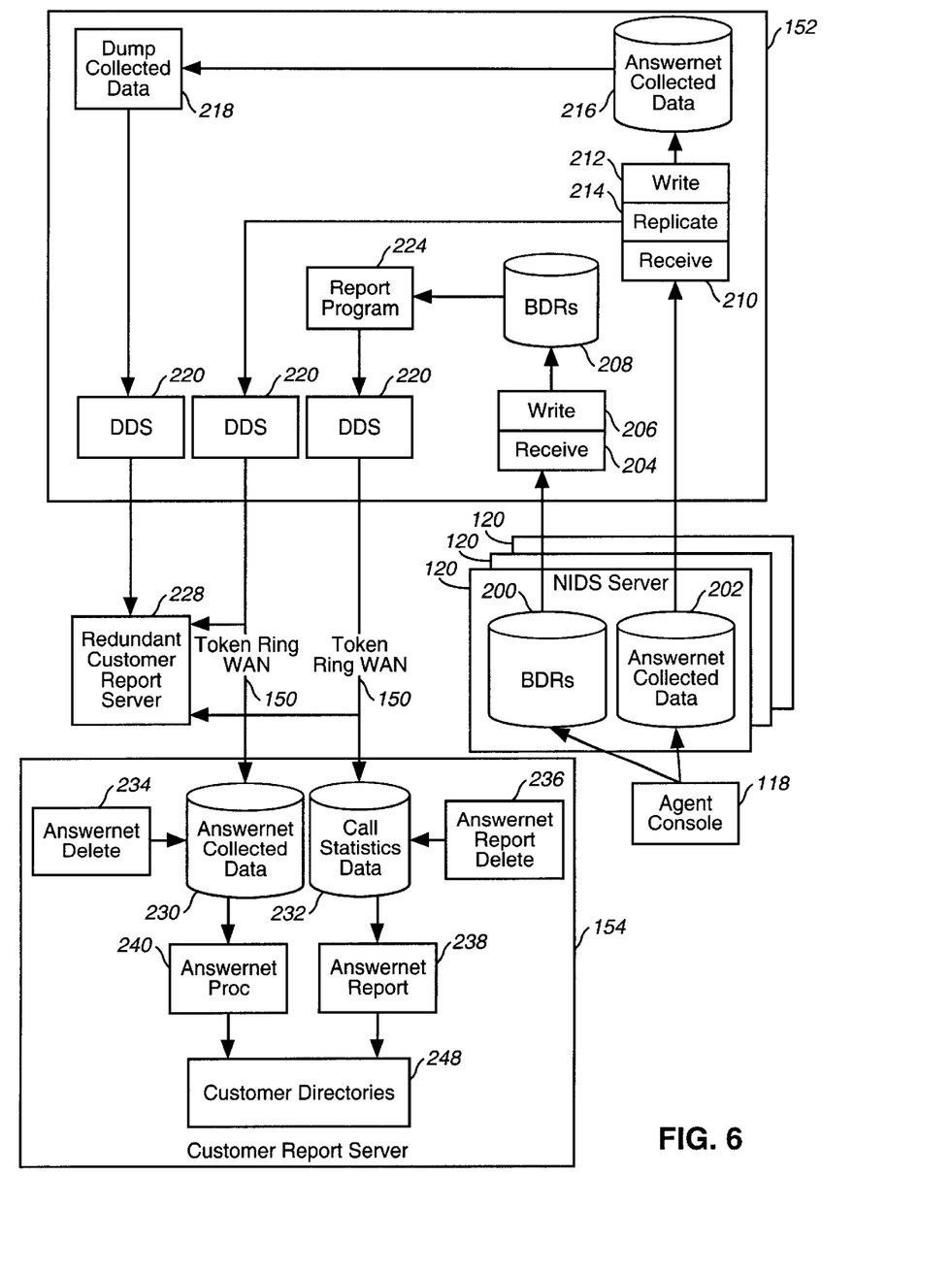
FIG. 6 illustrates the logical architecture of the customer data delivery system.

FIG. 6 shows a logical architecture of the customer data delivery system 122. As was discussed above, the data gathered during a call by the agent is forwarded from the agent console 118 to NIDS server 120, where the data is stored in a collected data database 202. A BDR is also created and written to a BDR database 200 on the NIDS server. This transferring of the data occurs very shortly after a call is completed.

The collected data in the collected data database 202 is then transferred to the mainframe computer 152 which has a process includes functionality 210 for receiving the data. The process also includes replicate functionality 214 for replicating the data and write function 212 for writing the data into a collected data database 216 that is resident on the mainframe computer 152. Redundant copies of the collected data records are maintained to enhance the fault resilience of the system. As will be described in more detail below, one set of the records is stored on a redundant customer report server 228. The replicated data records are passed to the DDS 220, which forwards the records over the WAN 150 to the customer report server 154. The customer report server 154 stores the record in a collected data database 230. The Answernet Proc process compiles text reports from the data records in the collected data database and places these reports into customer directories 248. Each customer has an associated directory in which text reports may be placed. As will be described in more detail below, the customer then may retrieve the given reports from the associated customer directory. The Answernet Proc process extracts all new data records for each customer from database 230. The Answemet Proc then creates a text file for each customer containing data from these records. The text file constitutes a report that is delivered to the customer. This file is placed in the directory that is dedicated to the customer. The process marks each record that is extracted as having been read, and this marking is used by the process to determine which records are new in the database 230.

Those skilled in the art will appreciate that a separate thread or process may be dedicated for each customer in an alternative embodiment to the present invention. The answernet delete process 234 runs periodically to delete all records that have been extracted by Answemet Proc 240. It should be appreciated that the customer's profile specifies a record format for data delivery. This record format is used to create the reports that are sent to the customers.

There are multiple customer report servers to provide redundancy. The data records stored in database 216 are transmitted by a dump collected data process 218 to the DDS. The DDS writes these records to a redundant customer report server 228. The BDR's and replicated data records are also written by the DDS to the redundant customer report server 228. If the customer report server 154 crashes or if a customer is unable to retrieve reports from a particular customer report server made to retrieve records from the customer report server 154, the redundant customer report server 228 may be utilized.

Figure 8A:
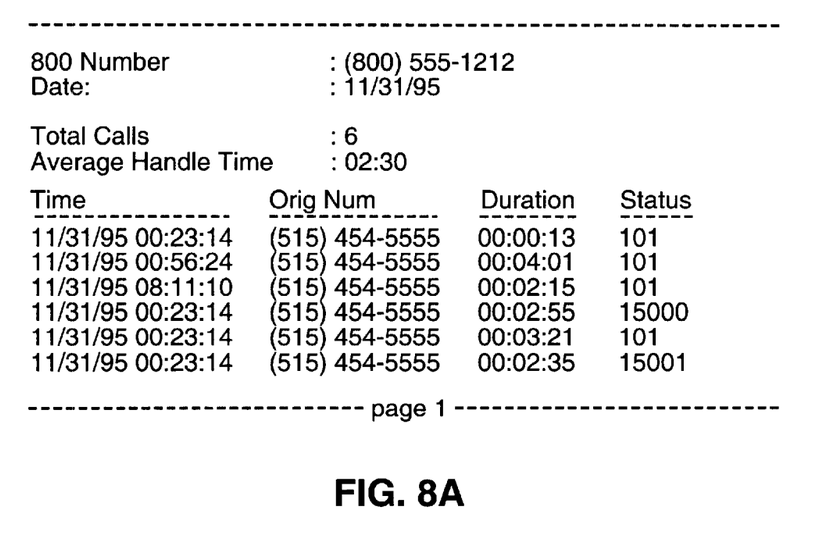
FIG. 8A shows a first example of a report generated by the customer data delivery system.
Figure 8B:
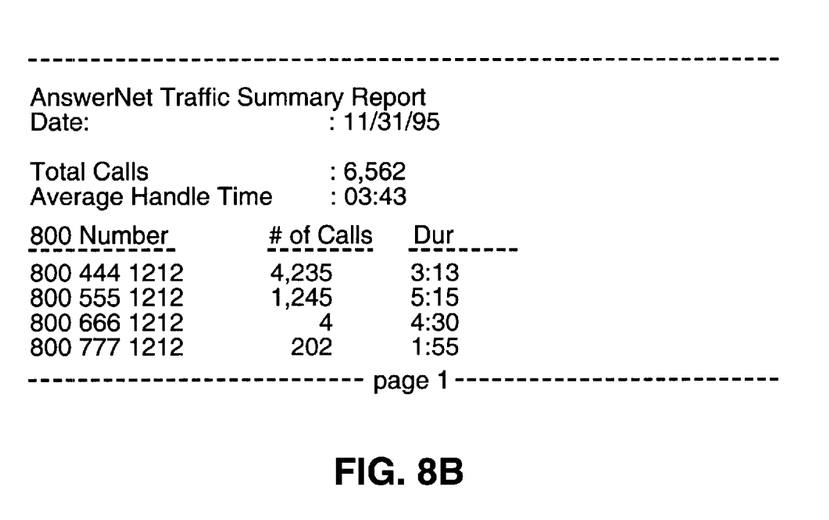
FIG. 8B shows a second example of a report generated by the customer data delivery system.

The BDRs stored in database 200 on the NIDS server 120 are also passed to the mainframe 152. The mainframe computer 152 includes a process that has receive functionality 204 for receiving the BDRs and write functionality 206 to assist in writing the BDRs to a BDR database 208 on the mainframe computer 152. A report program 224 executes to read the BDRs for a customer from the database 208. The report program creates call statistic reports. Summary reports are created that contains call summary information, such as the number of calls received in a time period, number of calls handled, average call waiting time, average call handling time, and the like. FIG. 8A shows an example of a company daily summary report, and FIG. 8B shows an example of an overall daily summary report.

For computational efficiency, the report program 224 may run intermittently at periodic intervals, such as once a day. Nevertheless, those skilled in the art will appreciate that the present invention may be practiced in instances where the report program 224 runs at intervals other than once a day.

The reports are sent to the customer report server(s) 154 via the DDS 150. Given that the report may be quite large, each line of the report may be sent as an individual data record to the customer report server(s) 154. Each record may be sent in a tag-length-data format, such as described above. The customer report server(s) 154 receives these records and writes them into call statistics database 232. An answernet report process 238 collects individual records from the database 232 for a single report. Records for a report are identified by the customer, report type, and a date/time. The Internet report process 238 builds a text report file from these records and places the file in the customer's directory 248. The incident report process 238 also marks each record as having been extracted for a report. The Internet report process 238 may run at limited times, such as once a day. Preferably, how often the Internet report process 238 runs is configurable.

Figure 7:
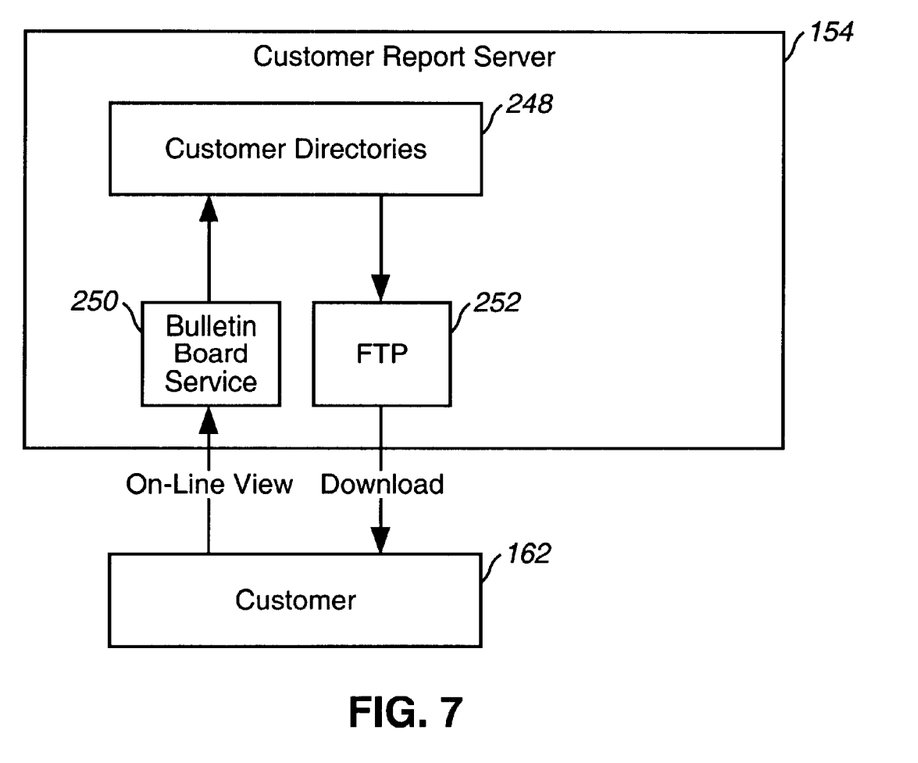
FIG. 7 illustrates components of the customer report server in more detail.

FIG. 7 illustrates the portion of a customer report server 154 that is used to deliver the reports to customer 162. A bulletin board service 250 is provided to allow a customer 162 to dial in to the customer report server 154 over PSTN 102 or a network, such as an intranet, the Internet, or an extranet, and view a listing of the reports. The listing is obtained from the customer's directory 248. The customer may view the report online or may download the report using FTP 252.

While the present invention has been described with reference to a preferred embodiment thereof, those skilled in the art will appreciate the various changes in the form and detail may be made without departing from the intended scope of the present invention as defined in the appended claims.

What is claimed is:

1. In a telecommunications system having a computer system and multiple call centers with multiple agent consoles stationed at said multiple call centers for handling calls with callers on behalf of customers, a method comprising the computer-implemented steps of:

collecting data at said multiple agent consoles from calls handled on behalf of a selected customer at each of said multiple call centers;

gathering said data from said multiple call centers and consolidating the gathered data in a report; and making the report available for retrieval by the selected customer following call completion via at least one of a communications network and an electronic bulletin board service.

2. In the telecommunications system of claim 1, the method further comprising delivering said report to said customers and services associated with said call centers using a single platform.

3. In the telecommunications system of claim 2, the method further comprising configuring the report to contain call statistics regarding the calls handled on behalf of the selected client.

4. In the telecommunications system of claim 2, the method further comprising configuring the report to contain billing information regarding the calls handled on behalf of the selected client.

5. In the telecommunications system of claim 2, the method further comprising configuring the report to be made available via the communications network.

6. In the telecommunications system of claim 5, the method further comprising configuring the report to be delivered to the selected customer using a file transfer protocol over the communications network.

7. In the telecommunications system of claim 2, the method further comprising configuring the telecommunications system to include the electronic bulletin board service, wherein the report is made available by the report being posted on the electronic bulletin board service.

8. In the telecommunications system of claim 2, the method further comprising:

generating an additional report holding data gathered from calls that were handled on behalf of the selected client; and making the additional report available to the selected customer.

9. In a system having a computer system and multiple geographically-distributed call centers, wherein each of said multiple call centers has multiple agent consoles for handling calls on behalf of customers, a method comprising the computer-implemented steps of:

collecting data at said multiple agent consoles from calls handled on behalf of a customer at each of said multiple call centers;

gathering said data collected from said multiple calls on agent consoles in said multiple call centers;

for each customer on behalf of which calls have been handled, generating a report holding at least some of the data that was collected from calls that were handled on behalf of the client; and posting the reports for retrieval by the customers via at least one of a communications network and an electronic bulletin board service.

10. In the telecommunications system of claim 9, the method further comprising delivering said report to said customers and services associated with said call centers using a single platform.

11. In the system of claim 10, the method further comprising configuring the report posted for a given one of the customers to contain call statistics regarding calls handled on behalf of the given client.

12. In the system of claim 10, the method further comprising configuring the report posted for a given one of the customers to contain billing information.

13. In a telecommunications system having a computer system and multiple call centers with multiple agent consoles for handling calls with callers on behalf of customers, a computer-readable medium holding computer-executable instructions for performing the computer-implemented steps comprising:

collecting data at said multiple agent consoles from calls handled on behalf of a selected customer at each of said multiple call centers;

gathering said data from said multiple call centers and consolidating the gathered data in a report; and making the report available for retrieval by the selected customer following call completion via at least one of a communications network and an electronic bulletin board service.

14. In the telecommunications system of claim 13, the computer-readable medium further performing the step of delivering said report to said customers and services associated with said call centers using a single platform.

15. In the telecommunications system of claim 14, the computer-readable medium further performing the step of configuring the report to contain call statistics regarding the calls handled on behalf of the selected client.

16. In the telecommunications system of claim 14, the computer-readable medium further performing the step of configuring the report to contain billing information regarding the calls handled on behalf of the selected client.

17. In the telecommunications system of claim 14, the computer-readable medium further performing the step of configuring the report to be delivered via the communications network.

18. In the telecommunications system of claim 17, the computer-readable medium further performing the step of configuring the report to be delivered to the selected customer using a file transfer protocol over the communications network.

19. In a system having a computer system and multiple geographically-distributed call centers, wherein each call center has multiple agent consoles for handling calls on behalf of customers, a computer-readable medium holding computer-executable instructions for performing the computer-implemented steps of:

collecting data on behalf of said customers at said multiple agent consoles from calls handled at each of said multiple call centers;

gathering said data collected from calls on agent consoles in the multiple call centers;

for each customer on behalf of which calls have been handled, generating a report holding at least some of the data that was collected from calls that were handled on behalf of said customers; and posting the report for retrieval by the customers via at least one of a communications network and an electronic bulletin board service.

20. In the telecommunications system of claim 19, the computer-readable medium further performing the step of delivering said report to said customers and services associated with said call centers using a single platform.

21. A customer report server for generating reports regarding call activity at multiple agent consoles in multiple call centers on behalf of customers, comprising:

a database holding data gathered at said multiple agent consoles in the multiple call centers regarding call activity on behalf of the customers;

a report generator for generating reports for the customers regarding call activity at said multiple agent consoles in the call centers on behalf of the customers; and an access subsystem for making the reports that are generated by the report generator accessible to the customers for retrieval via at least one of a computer network and an electronic bulletin board service.

22. The server of claim 21, wherein said reports and services associated with said call centers are performed using a single platform.

23. The server of claim 22 wherein the database holds call statistics data regarding call activity by the agents on behalf of the customers.

24. The server of claim 22 wherein the database holds records regarding billing details.

25. The server of claim 22 wherein the report generator generates a call statistics report that contains call statistics regarding call activity by the agents.

26. The server of claim 25 wherein the call statistics report contains summary statistics that summarize call activity on behalf of a selected customer.

27. The server of claim 25 wherein the call statistics report contains statistics regarding individual call handled by the agents on behalf of a selected customer.

28. The server of claim 25 wherein the access subsystem includes a network delivery subsystem for delivering the reports via the computer network.

29. The server of claim 28 wherein the computer network is the Internet.

* * * * *